United States Patent Office 3,128,260
Patented Apr. 7, 1964

3,128,260
COATING COMPOSITIONS COMPRISING COCO-
NUT OIL-MODIFIED PHTHALIC ALKYD RESINS
AND PREPARATION OF THE SAME
Theodore A. Langstroth, Cincinnati, Ohio, assignor to
Sterling Drug Inc., New York, N.Y., a corporation of
Delaware
No Drawing. Filed Mar. 25, 1958, Ser. No. 723,664
11 Claims. (Cl. 260—22)

This invention relates to alkyd resins and to coating compositions comprising the same. More particularly, the invention relates to certain coconut oil-modified phthalic alkyd resins, to improved flushed color pigmented coating compositions comprising said resins, and to the preparation thereof.

When intended for use in the formulation of pigmented coating compositions, coconut oil-modified phthalic alkyd resins are conventionally prepared in such manner that the resin has a low acid number, because it is the general experience in the coating art that the use of resins of high acid number is likely to involve danger of pigment reactivity and gelation with some pigments. For this reason, most of the commercially available coconut oil-modified phthalic alkyd resins have acid numbers on the order of 4–12. However, a serious drawback in the use of these low acid number resins is that pigmented coating compositions prepared by incorporation of colored pigments into these compositions by a flushing process ordinarily have color values far below the expected color values based on the amount of pigment employed. As will be appreciated, this loss of color value, which in many instances amounts to 50% or more, undesirably necessitates use of larger quantities of pigment than should be required for a given purpose.

It is an object of the present invention to provide means for obviating the loss of color value referred to hereinabove and thereby to overcome the drawback of the prior art compositions.

I have now succeeded in preparing a coconut oil-modified phthalic alkyd resin of relatively high acid number, in the approximate range 40–60, which when mixed with colored pigment and solvent by a flushing procedure forms a stable pigmented varnish having substantially full color value; and by incorporation of a dry-film forming component into said varnish there is obtained a stable flushed color pigmented coating composition in which substantially full color value of the pigment is retained. By virtue of these useful and highly advantageous results, which are completely unexpected in view of the prior art teachings, the instant invention affords a convenient and unobvious solution to the problem of color value loss in preparing colored pigmented coating compositions of the indicated type by a flushing procedure.

Generally speaking, the coconut oil-modified phthalic alkyd resins used in practicing my invention are obtained using the manipulative procedure of the so-called "alcoholysis" process of making oil-modified alkyd resins. Thus, in an initial step coconut oil is alcoholyzed with glycerol; the completion of the alcoholysis reaction is conveniently determined by ascertaining when a sample of the reaction mixture is completely soluble in three parts of methanol per part of reaction mixture. The alcoholysis product thus obtained is then esterified with phthalic anhydride to produce the coconut oil-modified phthalic alkyd resin. To produce the particular resins which I use in the instant invention, the two-step process is applied in the following manner. The alcoholysis step is carried out by heating glycerol and coconut oil in the approximate molar ratio of 0.75–0.85 mole of coconut oil per mole of glycerol, in the presence of an alcoholysis catalyst, such as lithium or calcium naphthenate, at a temperature in the approximate range 175–240° C. Phthalic anhydride, in the amount of 1–1.7 moles per mole of glycerol originally used, is then added and the esterification step is carried out by heating the mixture at a temperature in the approximate range 200–240° C. until the acid number of the resulting resin is in the approximate range 40–60. For these calculations, there is employed an average molecular weight of 260 for the coconut oil; the usual range of saponification values for coconut oil is about 251–264. Ordinarily, I prefer to employ the reactants in these two steps in the proportions of about 0.8 mole of coconut oil and about 1.6 moles of phthalic anhydride per mole of glycerol, and using a reaction temperature of about 220–230° C. for both the alcoholysis and the esterification steps.

The coconut oil-modified phthalic alkyd resins obtained in accordance with my invention as described above are readily reduced with liquid aromatic hydrocarbon solvents, such as toluene and xylene, to produce varnishes, which of course are of the non-drying type unless a suitable dry-film former is added.

The pigments useful for flushing into my new varnishes are any of the colored organic and inorganic pigments, or mixtures thereof, generally used in preparation of flushed colors employed in the coating art. Pigments of particular value are phthalocyanine blue, phthalocyanine green, Indanthrene Red-Violet RH, Toluidine Red, Lithosol Fast Yellow 3GD, and iron blue.

As will of course be understood, when non-drying oil-modified alkyd resins such as those involved in the present invention are employed as components of coating compositions they are ordinarily used in conjunction with a dry-film former, such as nitrocellulose, urea-formaldehyde resins, and melamine-formaldehyde resins, and it is in such use that my invention finds particular value. These new coating compositions thus comprise a dry-film former and a pigmented varnish consisting essentially of a flushed color, a liquid aromatic hydrocarbon solvent, and a coconut oil-modified phthalic alkyd resin obtained by alcoholyzing coconut oil with glycerol and esterifying the product thus produced with phthalic anhydride to an acid number in the approximate range 40–60, employing the approximate proportions of 0.75–0.85 mole of coconut oil and 1–1.7 moles of phthalic anhydride per mole of glycerol. Optionally, there can be added to my new coating compositions further pigment, resin and solvent components, as for example, flushed or dry pigments, natural or synthetic drying or non-drying resins, and aliphatic solvents. These optional ingredients can be added as separate ingredients or as pigmented or non-pigmented varnishes.

The conventional manipulative procedures of the coating art can be used to formulate my novel coating compositions. For instance, the coconut oil-modified phthalic alkyd is reduced with a liquid aromatic hydrocarbon solvent, such as toluene or xylene, and a water-wet colored pigment pulp is flushed into the resulting varnish. A dry-film former, if desired, can be added either before, during, or preferably after the flushing process. Other conventional ingredients of coating compositions such as plasticizers, driers, and the like, can be added in appropriate, known fashion.

The new flushed color pigmented coating compositions comprising the coconut oil-modified phthalic alkyl resins obtained in accordance with my invention are stable compositions in which the colored pigment shows substantially full color strength. In contrast, flushed color pigmented compositions otherwise similar in constitution and containing the same pigment concentration but containing conventional low acid number coconut oil-modified phthalic alkyd resins instead of the resins obtained in accordance with the instant invention show substantially less color strength. My novel coating compositions containing a dry-film former are highly useful for preparing hard, glossy, colored films having good adhesion; for example, they are especially adapted to use as furniture finishes and automobile finishes.

My invention is illustrated by the following examples without, however, being limited thereto. The parts indicated below in these examples are parts by weight.

EXAMPLE 1

*Pigmented Lacquer*

(A) A mixture of 800 parts of coconut oil and 340 parts of glycerol was heated in an atmosphere of carbon dioxide to approximately 170° C., 2 parts of lithium naphthenate was then added, and the mixture was heated at approximately 230° C. until a sample of the reaction mixture was soluble in three parts of methanol per part of reaction mixture. This required about three hours. Then 860 parts of phthalic anhydride was added and the mixture was heated at approximately 230° C. until the acid number of the alkyd resin thus produced was 50, at which time the reaction was terminated; this reaction required about seven hours.

(B) The yield of alkyd resin obtained as described above in part A was reduced with 1210 parts of xylene to form a varnish having a solids content of 60%.

(C) 5 parts of water-wet phthalocyanine blue pigment pulp (equivalent to one part of pigment on a dry basis) was flushed with one part of the varnish obtained as described in part B above and, after removing the aqueous layer which separated and drying the organic layer on a three-roll mill, there was added one more part of the same varnish.

(D) 20 parts of the pigmented varnish obtained in part C was added to a mixture composed of 87 parts of titanium dioxide, 176 parts of a mixture of 40 percent of xylene and 60 percent of a low acid number coconut oil-modified phthalic alkyd resin (Duraplex ND78-Rohm & Haas; acid number, 4–8), 50 parts of dibutyl phthalate, 160 parts of a mixture of 65 percent one-half second nitrocellulose RS and 35 percent ethanol, 13 parts of methyl ethyl ketone, 150 parts of methyl isobutyl ketone, 2 parts of methyl isobutyl carbinol, and 220 parts of toluene. The resulting opaque, light blue coating composition was useful as a lacquer, for instance on automobiles and on wood furniture.

(E) Water-wet iron blue pigment pulp was used in place of the phthalocyanine blue pigment pulp in the foregoing procedure to produce stable, opaque, blue coating compositions in which substantially full color value of the iron blue was retained.

EXAMPLE 2

*Pigmented Lacquer*

(A) Using the reaction conditions described in Example 1, 800 parts of coconut oil was alcoholyzed with 340 parts of glycerol and the resulting product was esterified with 900 parts of phthalic anhydride until the resulting alkyd resin had an acid number of 50.

(B) The alkyd resin obtained as described above in part A was reduced with 1300 parts of xylene to form a varnish. 5 parts of water-wet phthalocyanine green pigment pulp (equivalent to one part of pigment on a dry basis) was flushed with one part of the varnish and, after removing the aqueous layer which separated and drying the organic layer on a three-roll mill, there was added one more part of the varnish.

(C) 20 parts of the pigmented varnish obtained in part B was added to a mixture composed of 176 parts of a mixture of 40 percent of xylene and 60 percent of a low acid number coconut oil-modified phthalic alkyd resin (Duraplex ND78-Rohm & Haas; acid number 4–8), 50 parts of dibutyl phthalate, 160 parts of a mixture of 65 percent of one-half second nitrocellulose RS and 35 percent of ethanol, 13 parts of methyl ethyl ketone, 150 parts of methyl isobutyl ketone, 2 parts of methyl isobutyl carbinol, and 220 parts of toluene. The resulting clear, light green coating composition was useful as a lacquer, for instance on automobiles and on wood furniture. A dark green lacquer for the same purposes was obtained following the foregoing procedure but using 200 parts of the pigmented varnish and 75 parts of the low acid number coconut oil-modified phthalic alkyd resin, the remainder of the ingredients being used in the same proportions as indicated for the light green lacquer.

EXAMPLE 3

*Pigmented Enamel*

Following the same general procedure described in Example 1, 150 parts of coconut oil was alcoholyzed with 340 parts of glycerol and the product thus obtained was esterified with 800 parts of phthalic anhydride until the resulting alkyl resin had an acid number of 45. By reducing this product with 1150 parts of toluene there was obtained a varnish into which 5 parts water-wet Indanthrene Red-Violet RH pigment pulp (equivalent to 1 part of pigment on a dry basis) was flushed. 1 part of the maroon varnish obtained in this manner is added to a mixture of 280 parts of titanium dioxide, 400 parts of a mixture of 40% of xylene and 60% of a low acid number coconut oil-modified phthalic alkyd resin (Duraplex ND78-Rohm & Haas; acid number, 4–8), 100 parts of a mixture of 22.5% of butyl alcohol, 22.5% of xylene, and 55% of a melamine-formaldehyde resin (Resimene 875-Monsanto) and 220 parts of xylene. There is thus obtained a pink coating composition which is useful as an enamel, for instance for coating refrigerators and metal office furniture. A maroon enamel for the same purposes is obtained using 100 parts of the pigmented varnish and 350 parts of the low acid number coconut oil-modified phthalic alkyd resin, the remainder of the ingredients being used in the same proportions as indicated for the pink enamel.

In each of the foregoing examples, the pigment in the flushed color pigmented varnish and in the compositions comprising the same retains substantially full color value. For comparison with my new compositions, there were prepared pigmented varnishes and coating compositions of otherwise similar constitution but lacking the alkyd resin prepared in accordance with the instant invention and having substituted in place thereof an equal weight of various coconut oil-modified phthalic alkyds having acid numbers of 4–8 (resin I), 12 (resin II), 23 (resin III), 75 (resin IV), and 124 (resin V), respectively; additionally, there was prepared for comparison purposes a mixture (resin VI) of 3 parts of a coconut oil-modified phthalic alkyd having an acid number of 15 and one part of a coconut oil-modified phtahalic alkyd having an acid number of 155, the mixture having an acid number of approximately 50. The comparative results obtained regarding the average color value developed by pigments flushed into the respective varnishes containing resins I–VI, inclusive, and the resin (resin VII) of the instant invention were as follows:

| Resin | Acid Number | Approximate Proportion of Color Value Developed by Pigment When Flushed (1.0= full color development) |
|---|---|---|
| I | 4–8 | 0.5 |
| II | 12 | 0.5 |
| III | 23 | 0.75 |
| IV | 75 | 1.0 |
| V | 124 | 1.0 |
| VI (Mix) | 50 | 0.5 |
| VII | 40–60 | 1.0 |

It will be seen that use of the low acid number coconut oil-modified phthalic alkyd resins caused substantial loss of color value, and that this loss was not obviated by mixing sufficient high acid number resin therewith to give a mixture (VI) of acid number 50. Although use of the high acid number resins IV and V gave full color values, these pigmented varnishes proved to be unsatisfactory for the preparation of coating compositions because of poor film-forming properties.

I claim:

1. A coating composition comprising a dry-film former and a pigmented varnish consisting essentially of a flushed color, a liquid aromatic hydrocarbon solvent, and a coconut oil-modified phthalic alkyd resin obtained by alcoholyzing coconut oil with glycerol and esterifying the alcoholysis product with phthalic anhydride to an acid number in the approximate range 40–60, the approximate proportions of the reactants being 0.75–0.85 mole of coconut oil and 1–1.7 moles of phthalic anhydride per mole of glycerol.

2. A coating composition comprising a dry-film former and a pigmented varnish consisting essentially of flushed phthalocyanine blue, a liquid aromatic hydrocarbon solvent, and a coconut oil-modified phthalic alkyd resin obtained by alcoholyzing coconut oil with glycerol and esterifying the alcoholysis product with phthalic anhydride to an acid number in the approximate range 40–60, the approximate proportions of the reactants being 0.75–0.85 mole of coconut oil and 1–1.7 moles of phthalic anhydride per mole of glycerol.

3. A coating composition comprising a dry-film former, a pigmented varnish consisting essentially of flushed phthalocyanine green, a liquid aromatic hydrocarbon solvent, and a coconut oil-modified phthalic alkyd resin obtained by alcoholyzing coconut oil with glycerol and esterifying the resulting alcoholysis product with phthalic anhydride to an acid number in the approximate range 40–60, the approximate proportions of the reactants being 0.75–0.85 mole of coconut oil and 1–1.7 moles of phthalic anhydride per mole of glycerol.

4. A coating composition comprising a dry-film former and a pigmented varnish consisting essentially of flushed Toluidine Red, a liquid aromatic hydrocarbon solvent, and a coconut oil-modified phthalic alkyd resin obtained by alcoholyzing coconut oil with glycerol and esterifying the alcoholysis product with phthalic anhydride to an acid number in the approximate range 40–60, the reactants being 0.75–0.85 mole of coconut oil and 1–1.7 moles of phthalic anhydride per mole of glycerol.

5. A coating composition comprising a dry-film former and a pigmented varnish consisting essentially of flushed iron blue, a liquid aromatic hydrocarbon solvent, and a coconut oil-modified phthalic alkyd resin obtained by alcoholyzing coconut oil with glycerol and esterifying the alcoholysis product with phthalic anhydride to an acid number in the approximate range 40–60, the approximate proportions of the reactants being 0.75–0.85 mole of coconut oil and 1–1.7 moles of phthalic anhydride per mole of glycerol.

6. A coating composition comprising a dry-film former and a pigmented varnish consisting essentially of flushed Indanthrene Red-Violet RH, a liquid aromatic hydrocarbon solvent, and a coconut oil-modified phthalic alkyd resin obtained by alcoholyzing coconut oil with glycerol and esterifying the alcoholysis product with phthalic anhydride to an acid number in the approximate range 40–60, the approximate proportions of the reactants being 0.75–0.85 mole of coconut oil and 1–1.7 moles of phthalic anhydride per mole of glycerol.

7. A coating composition comprising a dry-film former, titanium dioxide, a coconut oil-modified phthalic alkyd resin having an acid number in the approximate range 4–12, and a pigmented varnish consisting essentially of a flushed color, a liquid aromatic hydrocarbon solvent, and a coconut oil-modified phthalic alkyd resin obtained by alcoholyzing coconut oil with glycerol and esterifying the alcoholysis product with phthalic anhydride to an acid number in the approximate range 40–60, the approximate proportions of the reactants being 0.75–0.85 mole of coconut oil and 1–1.7 moles of phthalic anhydride per mole of glycerol.

8. A pigmented varnish consisting essentially of a flushed color, a liquid aromatic hydrocarbon solvent, and a coconut oil-modified phthalic alkyd resin obtained by alcoholyzing coconut oil with glycerol and esterifying the alcoholysis product with phthalic anhydride to an acid number in the approximate range 40–60, the approximate proportions of the reactants being 0.75–0.85 mole of coconut oil and 1–1.7 moles of phthalic anhydride per mole of glycerol.

9. A pigmented varnish consisting essentially of a flushed color, a liquid aromatic hydrocarbon solvent, and a coconut oil-modified phthalic alkyd resin obtained by alcoholyzing coconut oil with glycerol and esterifying the alcoholysis product with phthalic anhydride to an acid number of approximately 50, the approximate proportions of the reactants being 0.75–0.85 mole of coconut oil and 1–1.7 moles of phthalic anhydride per mole of glycerol.

10. A pigmented varnish consisting essentially of flushed phthalocyanine blue, a liquid aromatic hydrocarbon solvent, and a coconut oil-modified phthalic alkyd resin obtained by alcoholyzing coconut oil with glycerol and esterifying the alcoholysis product with phthalic anhydride, to an acid number in the approximate range 40–60, the approximate proportions of the reactants being 0.75–0.85 mole of coconut oil and 1–1.7 moles of phthalic anhydride per mole of glycerol.

11. A pigmented varnish consisting essentially of flushed phthalocyanine green, a liquid aromatic hydrocarbon solvent, and a coconut oil-modified phthalic alkyd resin obtained by alcoholyzing coconut oil with glycerol and esterifying the alcoholysis product with phthalic anhydride to an acid number in the approximate range 40–60, the approximate proportions of the reactants being 0.75–0.85 mole of coconut oil and 1–1.7 moles of phthalic anhydride per mole of glycerol.

References Cited in the file of this patent

UNITED STATES PATENTS

| | | |
|---|---|---|
| 2,526,345 | Giambalvo | Oct. 17, 1950 |
| 2,600,457 | Wynstra | June 17, 1952 |
| 2,642,404 | Pike | June 16, 1953 |
| 2,879,246 | Jackson | Mar. 24, 1959 |
| 2,881,145 | Schmutzler | Apr. 7, 1959 |

OTHER REFERENCES

"Organic Coating Technology," by H. F. Payne, volume 1, 1954, pages 283 to 285.